United States Patent
Hiraki

(10) Patent No.: US 10,377,058 B2
(45) Date of Patent: Aug. 13, 2019

(54) MOLD FOR RUBBER ARTICLE

(71) Applicant: BRIDGESTONE CORPORATION, Tokyo (JP)

(72) Inventor: Shunsuke Hiraki, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/580,846

(22) PCT Filed: Jun. 7, 2016

(86) PCT No.: PCT/JP2016/066950
§ 371 (c)(1),
(2) Date: Dec. 8, 2017

(87) PCT Pub. No.: WO2016/199773
PCT Pub. Date: Dec. 15, 2016

(65) Prior Publication Data
US 2018/0339430 A1 Nov. 29, 2018

(30) Foreign Application Priority Data
Jun. 9, 2015 (JP) ................................. 2015-116927

(51) Int. Cl.
*B29C 33/10* (2006.01)
*B29D 30/06* (2006.01)
(Continued)

(52) U.S. Cl.
CPC ............ *B29C 33/046* (2013.01); *B29C 33/02* (2013.01); *B29C 33/10* (2013.01); *B29C 35/02* (2013.01);
(Continued)

(58) Field of Classification Search
CPC ................ B29C 33/10; B29C 33/3842; B29C 2033/385; B29D 30/0606; B29D 2030/0617; B29D 2030/0609
See application file for complete search history.

(56) References Cited

U.S. PATENT DOCUMENTS 4,026,512 A * 5/1977 Holt ........................ B22C 9/067
138/40
4,708,609 A * 11/1987 Yoda ....................... B29C 33/10
249/102
(Continued)

FOREIGN PATENT DOCUMENTS

CN 104684718 A 6/2015
EP 0 818 290 A2 1/1998
(Continued)

OTHER PUBLICATIONS

May 4, 2018 Search Report issued in European Patent Application No. 16807480.5.
(Continued)

*Primary Examiner* — James P Mackey
(74) *Attorney, Agent, or Firm* — Oliff PLC

(57) ABSTRACT

A tire mold capable of improving the efficiency in mold production and tire production without compromising the aesthetic quality and performance of a tire after cure-molding. To that end, the tire mold has a hole that penetrates from the molding surface for molding a rubber article to the back surface, a core member that is disposed inside the hole and forms an air discharge flow channel annular in cross section extending along the extension direction of the hole between itself and the hole wall forming the hole, and an interlinking part for interlinking the hole wall and the core member.

6 Claims, 5 Drawing Sheets

(51) Int. Cl.
  *B29C 33/04* (2006.01)
  *B29C 33/02* (2006.01)
  *B29C 35/02* (2006.01)
  *B33Y 80/00* (2015.01)
  *B29C 64/153* (2017.01)
  *B29C 33/38* (2006.01)

(52) U.S. Cl.
  CPC ........ *B29C 35/0255* (2013.01); *B29C 64/153* (2017.08); *B29D 30/0606* (2013.01); *B29D 30/0629* (2013.01); *B29D 30/0662* (2013.01); *B33Y 80/00* (2014.12); *B29C 33/3842* (2013.01); *B29C 2033/385* (2013.01); *B29D 2030/0609* (2013.01); *B29D 2030/0617* (2013.01)

(56) References Cited

U.S. PATENT DOCUMENTS

| | | | |
|---|---|---|---|
| 4,795,331 | A | 1/1989 | Cain et al. |
| 5,939,101 | A | 8/1999 | Green |
| 8,342,830 | B2 * | 1/2013 | Sugata ............... B29C 33/10 425/28.1 |
| 9,815,249 | B2 * | 11/2017 | Sasaki ............ B29D 30/0629 |
| 2005/0238744 | A1 | 10/2005 | Nakai |
| 2009/0261509 | A1 | 10/2009 | Furutani |
| 2015/0283769 | A1 | 10/2015 | Gueugneau et al. |
| 2016/0039160 | A1 | 11/2016 | Calvel et al. |

FOREIGN PATENT DOCUMENTS

| | | |
|---|---|---|
| EP | 0 875 350 A2 | 11/1998 |
| FR | 2 996 798 A1 | 4/2014 |
| JP | S57-137134 A | 8/1982 |
| JP | H01-122415 A | 5/1989 |
| JP | H10-296735 A | 11/1998 |
| JP | H11-300746 A | 11/1999 |
| JP | 2005-305921 A | 11/2005 |
| JP | 2006-159596 A | 6/2006 |
| JP | 2006-168253 A | 6/2006 |
| JP | 2007-038426 A | 2/2007 |
| JP | 2009-255485 A | 11/2009 |
| JP | 2011-116012 A | 6/2011 |
| WO | 2014/060209 A1 | 4/2014 |
| WO | 2014/129651 A1 | 8/2014 |
| WO | 2014/199550 A1 | 12/2014 |
| WO | 2015/156413 A1 | 10/2015 |

OTHER PUBLICATIONS

Jul. 12, 2016 Search Report issued in International Patent Application No. PCT/JP2016/066950.
Jul. 12, 2016 Written Opinion issued in International Patent Application No. PCT/JP2016/066950.
Apr. 17, 2019 Search Report issued in Chinese Application No. 2016800423925.

* cited by examiner

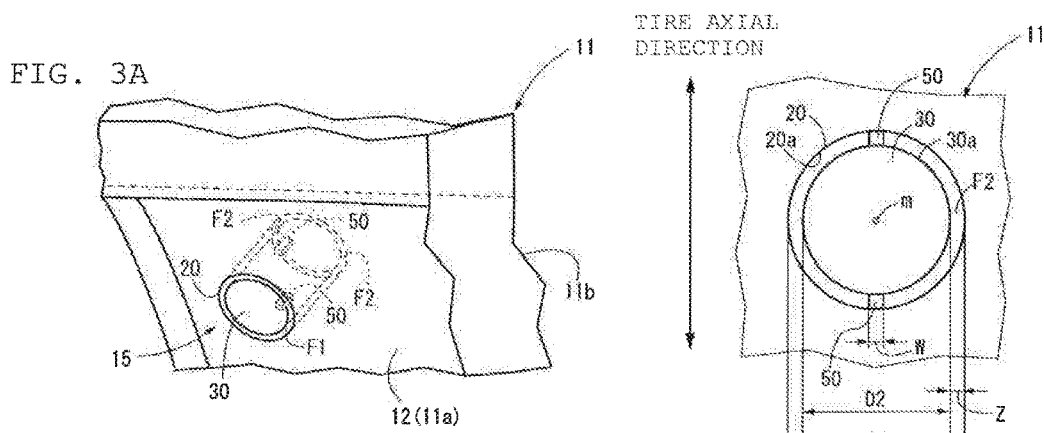
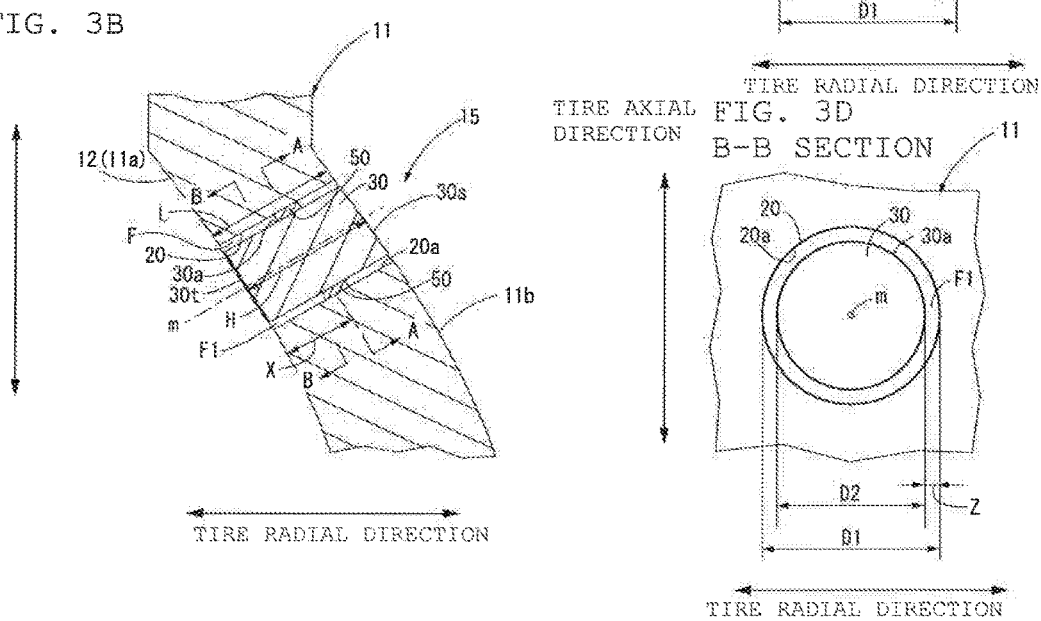
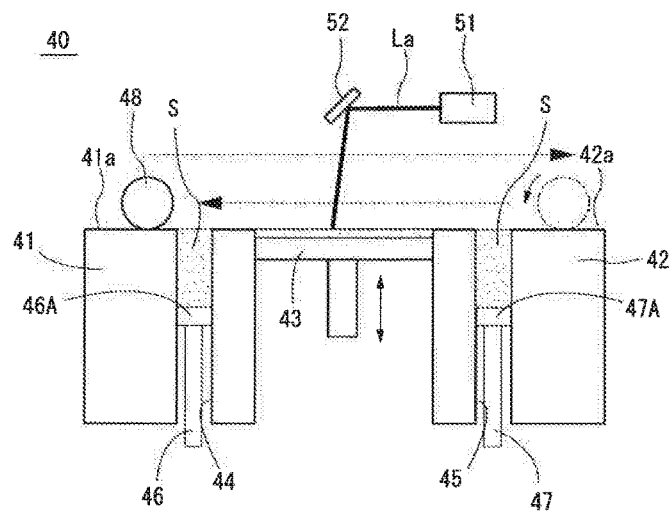

MOLD FOR RUBBER ARTICLE

BACKGROUND OF THE INVENTION

1. Field of the Invention

The present invention relates to a rubber article mold and, more particularly, to a rubber article mold capable of improving the production efficiency of rubber articles.

2. Description of the Related Art

Conventionally, a tire curing mold is provided with a plurality of air vent holes for discharging air from between the tire surface and the molding surface of the mold during curing (vulcanization). The air vent holes are each formed into a circular hole about 0.6 mm to 1.6 mm in diameter, for instance, by drilling or by driving a cylindrical member called a vent piece into the hole prepared in advance when the mold is manufactured. It is also known that the air vent hole can be a factor for the formation of needle-like spews each 10 mm or longer often found on the peripheral surface of the cured tire because rubber enters the hole during the curing process. The spews must be removed after cure-molding because of their detrimental effects on the appearance and performance of the product tire. However, the root portions of the scars remaining on the tire surface cause unevenness of the tire surface. And this becomes a factor to reduce the ground contact area of the tire and thus a lowered initial performance of the tire.

In contrast to this, Patent Document 1 discloses an arrangement consisting of a plug configured to shut off the flow of air through the air vent hole and a spring urging the plug toward the molding surface side provided within the air vent hole. According to this arrangement, the flow of air through the gap between the hole wall of the air vent hole and the periphery of the plug is allowed before the surface of the tire being cured comes in contact with the plug. On the other hand, when the tire surface in contact with the plug pushes the plug with a force greater than the biasing (urging) force of the spring, the air vent hole is blocked with the plug pushed against the air vent hole. This will impede the entry of rubber into the air vent hole and prevent the occurrence of spews.

Also, Patent Document 2 discloses a technology of manufacturing a tire mold by casting, in which insert casting is done with a plurality of thin-plate blades having the coefficient of expansion different from that of the mold material provided so as to penetrate from the molding surface to the back surface. And air vent holes are formed as slit gaps occurring between the blades and the mold body as a result of difference in shrinkage factor between the blades and the mold body after cooling. In this manner, the formation of spews is prevented by enabling the discharge of air from the molding surface side to the back surface side.

CONVENTIONAL ART DOCUMENT

Patent Document

Patent Document 1: Japanese Unexamined Patent Application Publication No. 2011-116012
Patent Document 2: Japanese Unexamined Patent Application Publication No. 11-300746

SUMMARY OF THE INVENTION

Problem to be Solved by the Invention

However, according to the above-mentioned Patent Document 1, it is necessary to provide parts, such as a plug and a spring, in each of the air vent holes. This causes a problem of affecting the production efficiency of the mold itself. That is, the mold for molding a tire requires about 1000 air vent holes to be formed therein. And many man-hours and time must be spent in placing a spring and plug in each of the air vent holes, which will impair the efficiency.

Also, according to Patent Document 2, spews of thin plate shapes are formed on the tire surface. And these spews can be easily severed when the tire is removed from the mold, and the severed rubber can block the air vent holes, thus causing the loss of the function of the air vent holes. To remove the rubber clogging the gap, therefore, it is necessary to clean the mold frequently. And this leads to a lowered production efficiency of tires.

Thus, an object of the present invention is to provide a tire mold capable of improving the efficiency in tire production without compromising the aesthetic quality and performance of a tire after cure-molding.

Means for Solving the Problem

To solve the above-described problems, a mold for rubber articles of the invention includes a hole penetrating from a molding surface for molding a rubber article to a back surface thereof, a core member disposed within the hole and forming an air discharge flow channel annular in cross section extending along the extension direction of the hole between itself and the hole wall forming the hole, and an interlinking part interlinking the hole wall to the core member.

It is to be understood that the foregoing summary of the invention does not necessarily recite all of the features essential to the invention, and subcombinations of all these features are intended to be included in the invention.

BRIEF DESCRIPTION OF THE DRAWINGS

FIG. 3 is an oblique perspective view, a cross-sectional view, and plan views of an air discharge means provided in the tread mold.

FIG. 4 is an illustration showing an embodiment of an additive manufacturing apparatus.

BEST MODE FOR CARRYING OUT THE INVENTION

Hereinafter, the invention will be described based on preferred embodiments which do not intend to limit the scope of the claims of the present invention. Not all of the combinations of the features described in the embodiments are necessarily essential to the invention.

Figure 1:
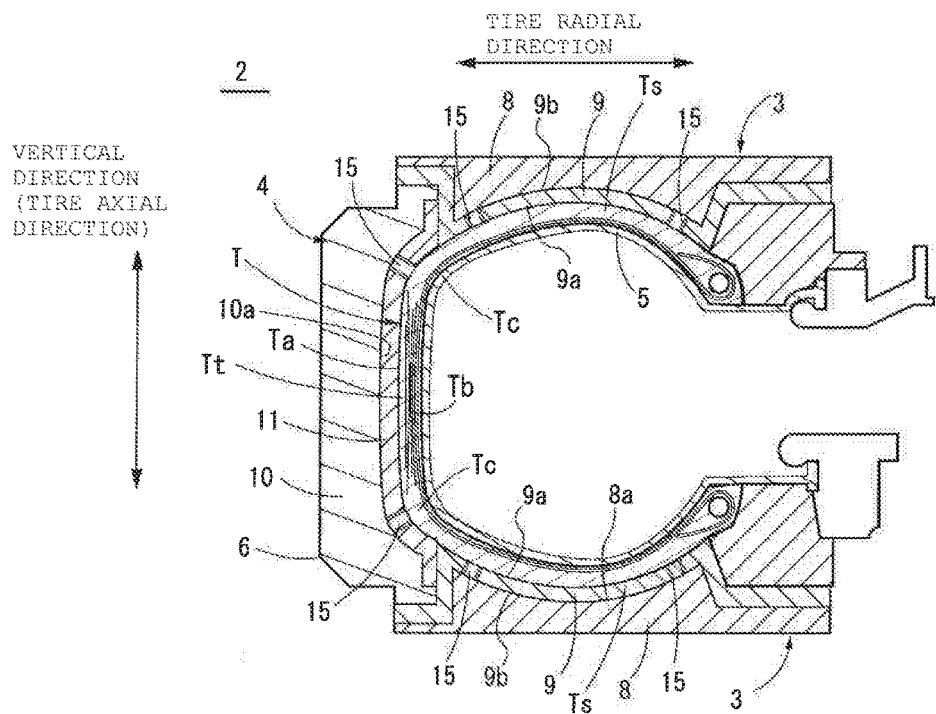
FIG. 1 is a half cross section schematically showing the main part of a curing apparatus.

FIG. 1 is a half cross section schematically showing the main part of a curing apparatus 2. The mold according to the present embodiment is placed inside the curing apparatus 2 as shown in FIG. 1. The curing apparatus 2 has a pair of side molding sections 3, 3 for molding the side regions Ts of the outer surface of a tire T, a tread molding section 4 for molding the tread region Tt, and a bladder 5 for molding the inner surface of the tire. The side molding sections 3, 3, which are disposed vertically opposite to each other, are formed approximately in a disk shape circumferentially along the side regions Ts of the tire T. The tread molding section 4, which is disposed between the upper and lower side molding sections 3, 3, is comprised of a plurality of sector pieces 6 disposed annularly along the circumference of the tire T. The side molding sections 3, 3 each consist of a base board 8 and a side mold 9. The baseboard 8 is an attachment for securing the side mold 9. The side mold 9 has a predetermined molding pattern for molding on the surface of a side region Ts of an uncured tire T. The sector piece 6 consists of a sector segment 10 and a tread mold 11. The sector segment 10 is an attachment for securing a plurality of division pieces of a tread mold 11. The tread mold 11 has a molding pattern for performing a predetermined molding on the tread region Tt of an uncured tire T. Also, the side mold 9 and the tread mold 11 have air discharge means for discharging air trapped between the molding surface and the outer surface Ta of the tire T to the back-surface side at the time of tire molding.

The side mold 9 is so designed as to be vertically movable together with the base disk 8, whereas the tread mold 11 is so designed as to be radially movable together with the sector segment 10. The molding space enclosing the whole area of an uncured tire T is formed by getting the side molds 9, 9 and the tread molds 11, consisting of a plurality of sector pieces 6, closer to each other. Following the placement of an uncured tire T within the molding space, the bladder 5 disposed inside the tire T is inflated. With the inflation of the bladder 5, the tire T is pushed from inside toward the side molds 9, 9 and the tread molds 11. At this time, the air trapped between the outer surface Ta of the tire T and the surfaces of the side molds 9, 9 and the tread molds 11 is discharged through the air discharge means 19 from the molding-surface side to the back-surface side of the side molds 9, 9 and the tread molds 11. And the molding patterns formed on the side molds 9, 9 and the tread molds 11 are transferred to the outer surface of the tire T. Then simultaneously with the transfer of the molding patterns, the tire T is cure-molded by heating the tire Tat predetermined temperatures. It is to be noted that on completion of the cure-molding, mold opening takes place with the side molds 9, 9 and the tread molds 11 moved apart from each other, and the cured tire T is removed.

The side molds 9 and the tread molds 11 according to the present embodiment are manufactured by an additive manufacturing process. In the additive manufacturing process, the model data of the molds designed by the computer, or CAD, is converted into a plurality of partial shape data (hereinafter referred to as slice data) of layered slices equal in thickness. Based on the slice data, a laser beam is cast to the metal powder deposited into the thickness of the partial shape, and the sintered layer of the metal powder sintered by the laser irradiation is laminated in a sequential order into a three-dimensional mold.

Hereinbelow, a description is given of the side molds 9 and the tread molds 11 for molding the outer surface of the tire T. For the ease of explanation, the following description uses an example of a tread mold 11 only.

Figure 2:
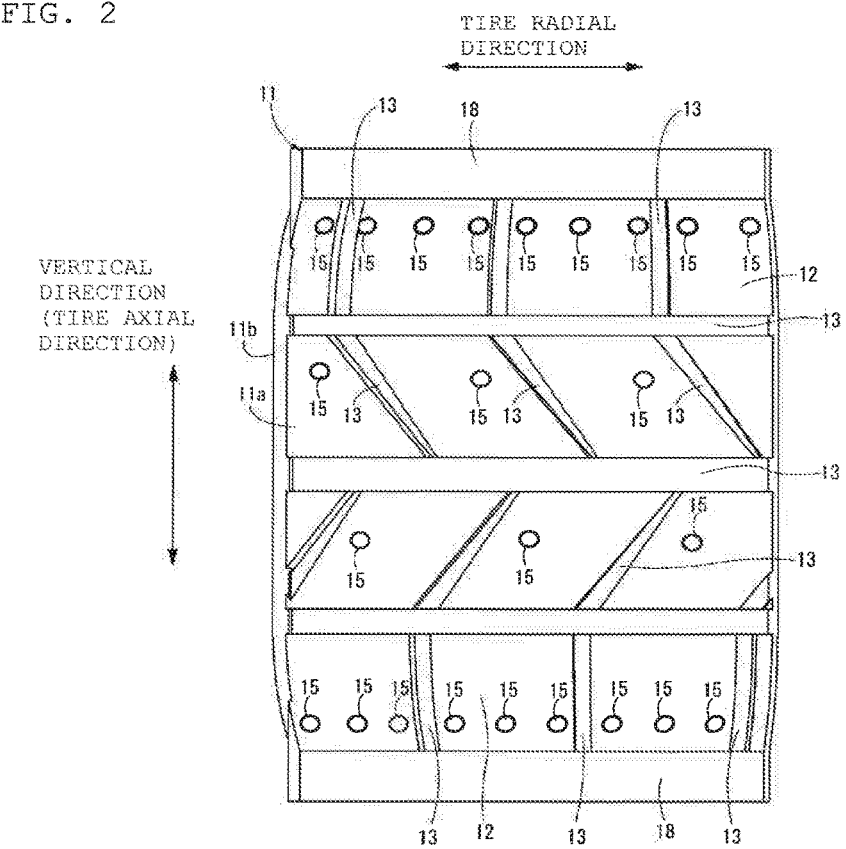
FIG. 2 is an illustration showing a tread mold.

FIG. 2 is an illustration showing a tread mold 11. As shown in FIG. 2, the tread mold 11 has contact area molding sections 12 for molding the contact area of the outer surface Ta of the tire T and a plurality of groove molding parts 13 for molding the tread region Tt on the molding surface 11a thereof and a plurality of air discharge means 15 for discharging air trapped between the outer surface Ta of the tire T and the molding surface 11a of the tread mold 11. The contact area molding sections 12, which are the base areas of the molding surface 11a formed with a predetermined curved surface of the whole molding surface of the tread mold 11, mold the contact area of a tire. The groove molding parts 13 are disposed in such a manner as to extend in the circumferential and axial directions of the tire projecting to predetermined heights from the contact area molding sections 12 of the molding surface 11a and mold grooves, such as rib grooves and lug grooves, recessed from the contact area of the tire. Since the tread molds 11 are disposed in such positions as to mold the tread region Tt of the tire T held horizontally within the curing apparatus 2, a plurality of air discharge means 15 are provided along the tire circumference in positions corresponding to the shoulder region Tc of the tire T where air can be trapped during the curing process (see FIG. 1).

FIG. 3A is an oblique perspective view of an air discharge means 15 to be provided at the designing of a tread mold 11. FIG. 3B is a cross-sectional view of air discharge means 15 of FIG. 3A including the axis thereof. FIGS. 3C and 3D are respectively an A-A section and a B-B section of the clearance F of the air discharge means 15 of FIG. 3B.

Especially as shown in FIG. 3B, the air discharge means 15 is constructed of a hole 20 penetrating from the contact area molding section 12 of the molding surface 11a of the tread mold 11 to the back surface thereof, a core member 30 disposed within the hole 20 to form a clearance F in an approximately annular sectional shape between itself and the hole wall 20a forming the hole 20, and interlinking parts 50 each extending between the hole wall 20a and the peripheral surface 30a of the core member 30 to fix the core member 30 immobile to the hole wall 20a. As shown in FIG. 3A, the clearance F formed between the hole wall 20a and the peripheral surface 30a of the core member 30, which extends along the hole axis m of the hole 20, serves as the air discharge flow channel for discharging air from the molding surface 11a side to the back surface 11b side.

That is, the air discharge flow channel has a hollow cavity formed as the clearance F penetrating from the molding surface 11a for molding a rubber article to the back surface. And the hollow cavity as the clearance F is formed as a space between the hole 20 in the body of the tread mold 11, provided as the outer member forming the hollow cavity, and the core member 30 provided as the inner member relative to the hole 20, not including the interlinking parts 50 interlinking the hole 20 and the core member 30.

As shown in FIG. 3B, the hole 20 is provided as a circular hole with the hole axis (axis line) m extending along the normal direction of the contact area molding section 12. The hole 20 extends linearly with a fixed diameter dimension D1 from the molding surface 11a side to the back surface 11b side. The diameter dimension D1 of the hole 20 may be about equal to or larger than that of conventional circular air discharge holes, which is 0.6 mm to 1.6 mm, and is set for 2 mm or larger, for instance.

As shown in FIG. 3B, the interlinking part 50 is formed with a predetermined projection dimension H from the hole wall 20a toward the peripheral surface 30a of the core member 30 on the back surface 11b side. The interlinking part 50 extends along the hole axis m until it reaches the back surface 11b from the point of origin X a predetermined distance from the opening edge on the molding surface 11a side toward the back surface 11b side. Also, as shown in FIG. 3C, the interlinking part 50 is disposed at two positions exactly opposite each other around the core member 30 with the hole axis m as the axis of symmetry. In other words, the interlinking parts 50 interlink the core member 30 immobile to the wall surface 20a by projecting at the shortest distance from the wall surface 20a toward the hole axis m on the same straight line orthogonal to the hole axis m. The length dimension W of the interlinking part 50 along the circumference of the hole 20 is so set as to be no impediment to the flow of air from the molding surface 11a to the back surface 11b side and to provide a strength enough to cause no change in the position of the core member 30 within the hole 20 when the core member 30 is pushed by the tire at the molding.

The core member 30 is a shaft body extending along the extension direction of the hole 20 and positioned within the hole 20 by the above-described interlinking parts 50. The diameter dimension D2 of the core member 30 is set smaller than the diameter dimension D1 of the hole 20. And a clearance F having a uniform dimension (clearance width Z) along the circumference of the core member 30 is formed between the peripheral surface 30a of the core member 30 and the hole wall 20a. The shaft center of the core member 30 is coaxial with the hole axis m of the hole 20. As shown in FIG. 3B, the end surface 30t of the core member 30 on the molding surface 11a side is formed flush with the shape of curvature of the contact area molding section 12. The arrangement like this can prevent the unnecessary unevenness from resulting on the inside and outside of the annular spew to be discussed later. Also, the end surface 30s of the core member 30 on the back surface 11b side is formed flush with the back surface 11b such that it does not protrude from the back surface 11b. That is, the length L of the core member 30 along the hole axis m is the same as or shorter than the thickness H from the molding surface 11a to the back surface 11b.

Next, a description is given of the changes in the sectional shape along the hole axis m of the clearance F defined by the hole wall 20a of the hole 20 and the peripheral surface 30a of the core member 30. As shown in FIG. 3B, the core member 30 in the hole 20 is interlinked to the hole 20 by the interlinking part 50 extending toward the back surface 11b side from the point of origin X. Therefore, as shown in FIG. 3D, there is no interlinking part 50 within the range from the molding surface 11a to the point X. And the sectional shape of the clearance F in this range is annular, and the annular clearance F opens on the molding surface 11a. And when the curing comes to completion with the rubber entering in the annular clearance F opening on the molding surface 11a, the shape of the spew will be annular also. It is to be noted that in the following description, the clearance F in the range from the molding surface 11a to the point X is sometimes referred to as the annular clearance F1.

On the other hand, as shown in FIGS. 3B and 3D, the sectional shape of the clearance F from the point of origin X to the back surface 11b takes a plurality of arcs divided circumferentially by the presence of interlinking parts 50. In a like manner, in the following description, the clearance F in the range from the point X to the back surface 11b is sometimes referred to as the annular clearance F2. Thus, the sectional shape along the hole axis of the entire air discharge flow channel formed by the clearance F changes from an annular shape to arc shapes as it extends from the molding surface 11a to the back surface 11b.

As shown in FIGS. 3C and 3D, the clearance width Z of the annular clearance F1 and the annular clearance F2 is optionally set within a range of greater than 0 mm and smaller than 0.5 mm, for instance. More preferably, the clearance width Z may be set within a range of greater than 0 mm and smaller than 0.06 mm. Then it will be possible to keep the entry height of the rubber into the annular clearance F1 formed on the molding surface 11a side (protrusion height of spew from the tire surface) and the thickness of the spew within an ideal range while ensuring a proper rate of air flowing from the molding surface 11a to the back surface 11b side.

For example, if the clearance width Z is set to 0.5 mm or greater, then the entry height of the rubber may reduced resulting from an increase in the sectional area of the annular clearance F1. However, this may lead to an increased thickness of the annular spew, thus compromising the aesthetic quality and the initial performance of the tire. Also, if the clearance width Z is set to 0 mm, then the discharge of air from the molding surface 11a side cannot be accomplished, thus causing bares on the tire surface after the molding.

That is, if the clearance width Z is set to smaller than 0.5 mm, the spews formed will be very thin and low in height. Then, without the removal of the spews after cure-molding, the condition similar to the spew mark worn off by about 100 km of vehicular running will be created on condition that the vehicle fitted with the tires is operated normally on dry road surfaces. Hence, there will be no drop in the appearance quality as well as in the motion performance and anti-wear performance of the tire, which will result in generally excellent performance of the tire. It is to be noted that the initial travel of about 300 km with winter tires having low modulus of elasticity of the tread rubber is required before the spew marks after cutter removal of the spews formed by the air vent holes (circular cross section 1 to 2 mm diameter), which are conventional air discharge means, are worn off completely. And it is the initial travel of about 500 to 1000 km with high-performance passenger tires having high modulus of elasticity of the tread rubber. Moreover, the spews formed by making the clearance dimension of the annular hollow area smaller than 0.06 mm will be further reduced in height and disappear from the intermittent presence along the annular extension direction of the hollow area in the tire surface. That is, by making the width of the air vent hole larger than 0 mm and smaller than 0.06 mm without eliminating the air vent hole, there will be little entry of rubber into the air vent hole and only air will be discharged from there.

It is to be noted that if the diameter of the air vent hole is 0 mm (presence of no air vent hole), the tire cannot be manufactured because the air or gas discharge performance becomes nil and consequently there result flaws, dents and air blisters on the tire surface.

Thus, by setting the clearance width Z within the above-mentioned range, it will be possible to keep the protrusion height of spew from the tire surface low and the thickness of the spew within an ideal range of the annular spew while ensuring a proper rate of air flowing from the molding surface 11a toward the back surface 11b side. And the annular spew formed by the entry of rubber into the annular clearance F1 having the clearance width Z has a reduced protrusion height from the tire surface and thinner-walled annular shape compared with the conventional needle-like spew. Accordingly, the spews used on the product tire without the removal process may be easily crushed away by the contact with the road surface, thus minimizing the decrease in the contact area of the tire. Also, the annular spews with thin wall can easily disappear from the tire surface by friction with the road surface, thus allowing the tire to display stable performances from the initial stage of tire use.

It is to be noted that the setting of the clearance width Z can be done according the volume of spew which may vary according to tire types. Specifically, the volume of needle-like spew formed on a specific tire is calculated from the protrusion height of the spew and the sectional area of the conventional circular air vent hole that caused the spew. And on the assumption that the rubber of the calculated volume has entered in the annular clearance F1, the clearance width Z is set as appropriate within the above-mentioned range. Then the tire of the same type as the specific tire may be molded by the new side molds 9 and tread molds 11, thereby forming spews with a reduced protrusion height and thinner-walled annular shape than the needle-like spews.

Also, by this setting of the clearance width Z, the sectional area of the annular clearance F1 and the entry height of rubber into the annular clearance F1 can be calculated. Thus, it is possible to set the point of origin X of the interlinking part 50 at a position where the rubber does not reach.

FIG. 4 is an illustration showing an example of an additive manufacturing apparatus 40. The additive manufacturing apparatus 40 includes a pair of left and right stages 41, 42 disposed a predetermined distance apart from each other and a worktable 43 equipped vertically movably between the left and right stages 41, 42. The left and right stages 41, 42 are set to the same height so that the upper surfaces thereof are located in the same plane. The stages 41, 42 hold cylinder portions 44, 45 extending in the vertical direction, respectively. The cylinder portions 44, 45 open on the upper surface 41a, 42a sides of the stages 41, 42, respectively. Disposed inside the cylinder portions 44, 45 are feeders 46, 47 having pistons 46A, 47A slidable along the inner peripheral surfaces thereof, respectively. The feeders 46, 47 rise and fall along the axis lines of the cylinder portions 44, 45, respectively, by the operation of a not-shown drive mechanism driving according to the signals outputted from a not-shown additive manufacturing apparatus control means. Filled up to the upper surfaces of the stages 41, 42 on the pistons 46A, 47A is metal powder S to serve as the material for the manufacture of the mold.

Located on the upper surfaces 41a, 42a of the stages 41, 42 is a roller 48 that moves along the upper surfaces 41a, 42a. Driven by a not-shown drive unit, the roller 48 moves between the left and right stages 41, 42, with the peripheral surface thereof rolling in contact with the upper surfaces 41a, 42a of the left and right stages 41, 42. Located above the worktable 43 are a laser gun 51 for emitting a laser beam and an irradiation mirror 52 for directing the laser beam La emitted by the laser gun 51 toward the metal powder S. The irradiation mirror 52 forms a sintered layer by sintering the metal powder S deposited on the upper surface of the worktable 43 based on the control signals outputted from the not-shown additive manufacturing apparatus control means. The irradiation mirror 52 sinters the metal powder S deposited on the upper surface of the worktable 43 in a sequential order by moving along the coordinate axis set on the worktable 43 as the scanning direction, driven by a not-shown drive means based on the slice data outputted from the not-shown additive manufacturing apparatus control means. Upon completion of formation of a sintered layer corresponding to the first slice data, the sintering based on the slice data set above the first slice data is started. After this, sintered layers are laminated in correspondence with the respective slice data, and eventually a tread mold 11 in the form as shown in FIG. 2 is manufactured.

Hereinbelow, a description is given of a method for manufacturing an air discharge means 15 by an additive manufacturing apparatus 40. As described above, the air discharge means 15 according to the present embodiment is of such construction that the interlinking part 50 interlinks the hole wall 20a to the core member 30 and supports the core member 30 to form the annular clearance F1 opening on the molding surface 11a side and thus there is no connection between the core member 30 and the hole wall 20a within the range outside the interlinking part 50. Hence, the following setting at the time of designing the mold is required in order to provide an air discharge means 15 with accuracy in the mold using the above-described additive manufacturing apparatus.

That is, with the additive manufacturing apparatus 40 as shown in FIG. 4, the mold manufacturing progresses upward. Thus, a new sintered layer is stacked by depositing new metal powder S on the sintered layer already formed as apart of the core member 30 to form a new sintered layer constituting the parts other than the core member 30.

However, as mentioned above, the core member 30 has no connection with the hole wall 20a within the range outside the interlinking part 50. Hence, if the molding of the core member 30 is started before the molding of the interlinking part 50, dislocation of the position of the already sintered layer relative to the hole wall 20a can be caused when stacking new metal powder S on the sintered layer constituting apart of the already sintered core member 30. The position of core member 30 dislocated relative to the hole wall 20a may not only make it impossible to form a uniform clearance width Z between the hole 20 and the core member 30, but also bring about a molding with the core member 30 connected to the hole wall 20a. Therefore, when designing the tread mold 11, it is necessary to set the position of the interlinking part 50 on the underside of the lamination direction so that the interlinking part 50 may be molded before the start of molding of the core member 30.

Figure 5:
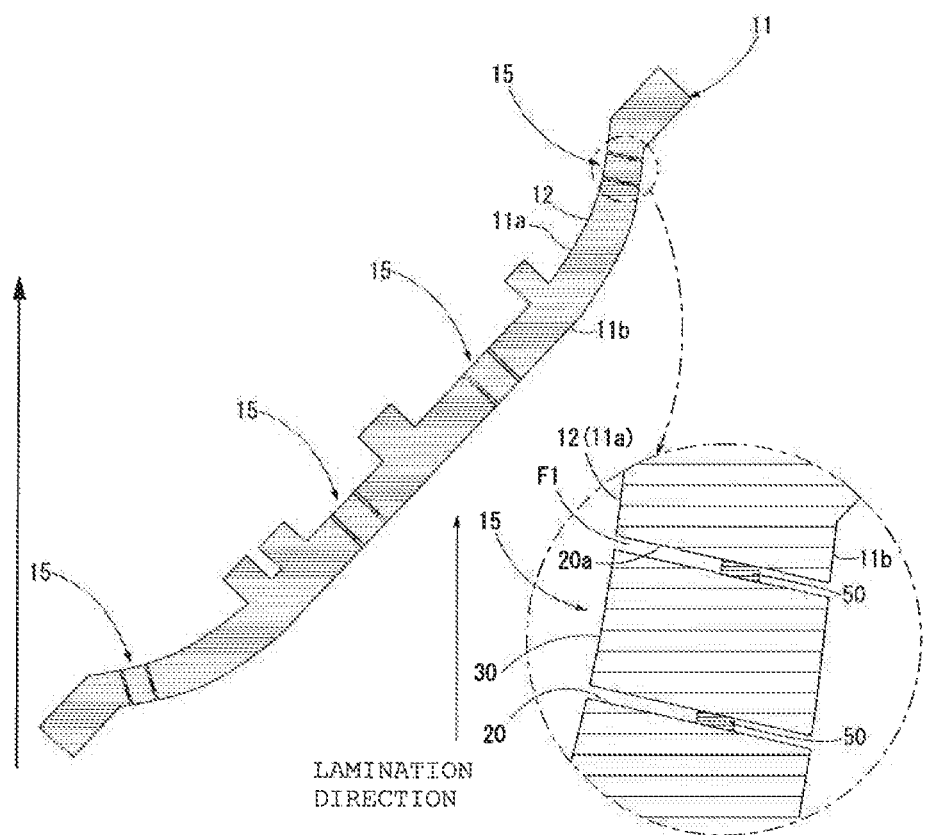
FIG. 5 is a cross-sectional view and an enlarged cross-sectional view of a tread mold.

FIG. 5 is a cross-sectional view and an enlarged cross-sectional view of a tread mold 11 sectioned along the tire axial direction. It is to be noted that the oblique lines in the figure do not represent hatching but the striped pattern of the sintered layers molded by the additive manufacturing apparatus 40. As shown in the figure, the interlinking part 50 is set on the underside of the lamination direction. That is, when the tread mold 11 is designed by CAD, the lamination direction is set such that the interlinking part 50 is molded at least before the start of molding a part of the core member 30. Also, since the tread mold 11 is in a three-dimensionally curved shape, the position of the interlinking part 50 formed varies with the location of the air discharge means 15. Hence, it is desirable that the interlinking part 50 be located in a position on the underside of the lamination direction according to the location of the air discharge means 15.

As a result, the air discharge means 15 is formed such that the molding of the hole wall 20a and the interlinking part is started after the start of molding the hole wall 20 of the hole 20 of the tread mold 11 and then the molding of the interlinking part 50 and the interlinking part 50 is started. Therefore, it is possible to create a state in which the core member 30 is supported relative to the hole wall 20a by interlinking it to the hole wall 20a by the interlinking part 50.

FIG. 6 is illustrations showing the states of a tread mold 11 having an air discharge means 15 during cure-molding of the tire T. Immediately after the start of curing, as shown in FIG. 6A, there exists air between the outer surface Ta of the uncured tire T placed in the molding space and the contact area molding section 12 of the molding surface 11a of the tread mold 11. With the bladder 5 disposed on the inner surface Tb side of the tire T being inflated from this state, the tire T is pressed toward the molding surface 11a of tread mold 11. And the air that has initially existed between the outer surface Ta of the tire T and the molding surface 11a is gradually discharged to the back surface 11b side through the air discharge flow channel consisting of the annular clearance F1 and the arc-shaped clearance F2. Then, as shown in FIG. 6B, as the inflation of the bladder 5 progresses, most of air is discharged from between the outer surface Ta of the tire T and the molding surface 11a to the back surface 11a. With the inflation of the bladder further progressing as shown in FIG. 6C, the tire T is further pushed toward the molding surface 11a side, and the rubber of the outer surface Ta of the tire T enters slowly into the annular clearance F1 toward the back surface 11b side. Finally, as shown in FIG. 6D, the rubber in the annular clearance F1 further enters toward the back surface 11b side with the cure-molding coming to an end before the rubber reaches the interlinking part 50.

Figure 6A:
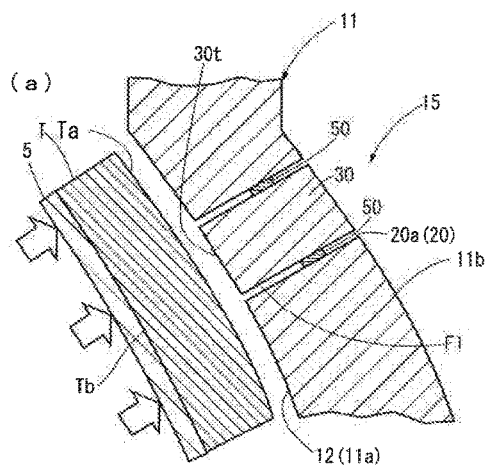
FIG. 6 is schematic illustrations showing the states of cure-molding of a tire at an air discharge means.
Figure 6B:
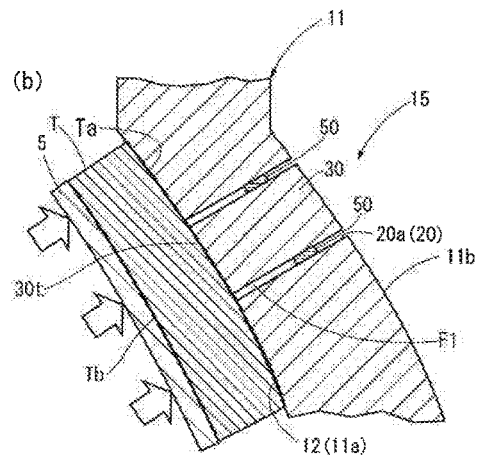
Figure 6C:
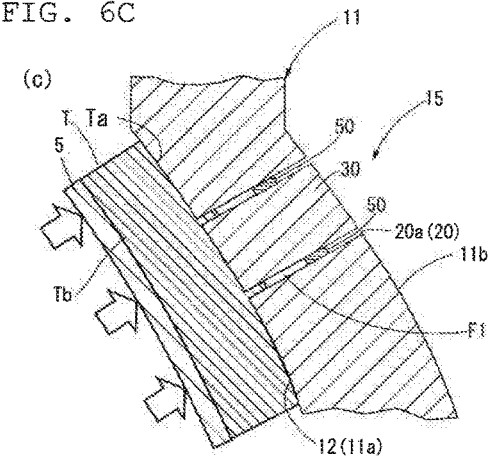
Figure 6D:
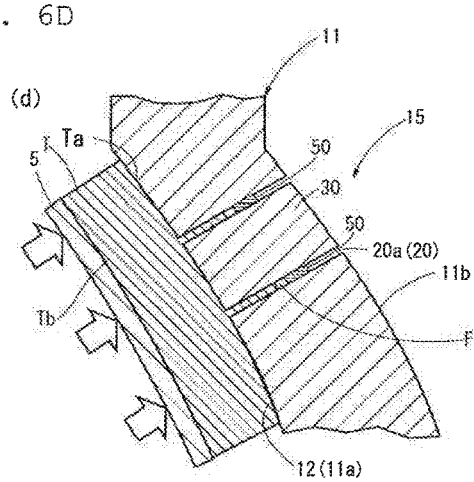
Figure 6E:
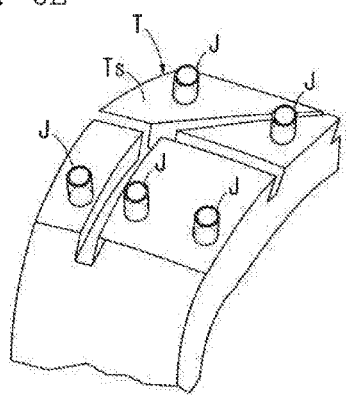

After the completion of cure-molding, the cured tire T is stripped out of the mold by separating the tread molds 11 radially and the side molds 9. 9 vertically. As shown in FIG. 6E, there are thin-walled spews J lower than the protrusion height of conventional spews on the surface of the cured tire T stripped out of the mold.

Also, frictional forces work on the spew J formed by the annular clearance F1 when it is pulled out from between the hole wall 20a and the peripheral surface 30a of the core member 30. However, since the spew J is in an annular shape, the frictional forces occurring between the hole wall 20a and the peripheral surface 30a are well-distributed. Hence, the spew J does not easily get torn with part or all of it remaining within the annular clearance F1. That is, with the mold having the air discharge means 15 of this construction, the possibility of spews remaining at mold stripping can be greatly reduced. Accordingly the number of cleaning of the air discharge flow channel consisting of the annular clearance F1 and the arc-shaped clearance F2 can be markedly reduced from that in conventional practice. Thus, the operating time for repeated molding becomes longer, and the productivity of tires can be improved.

Also, the air discharge means 15 is molded simultaneously with the tread mold by an additive manufacturing process. This will therefore eliminate the drilling process using a drill or the like or the process of fitting a spring and a plug, thereby improving the productivity of the tread mold itself.

Figure 7A:
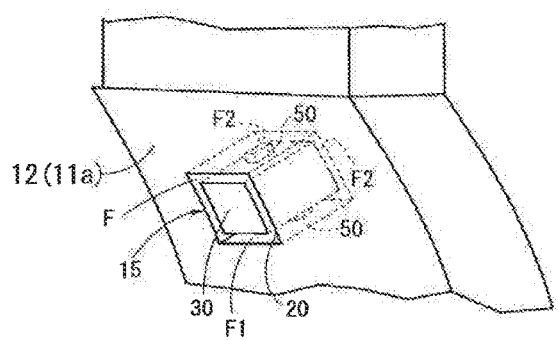
FIG. 7 is illustrations showing another implementation of an air discharge means.
Figure 7B:
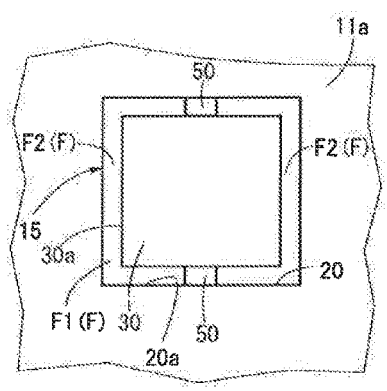

FIGS. 7A and 7B are illustrations showing another implementation of an air discharge means 15. In the foregoing embodiments, descriptions have been given on the assumption that the cross-sectional shape of the annular clearance F1 formed by the hole wall 20a and the core member 30 is circular. However, the cross-sectional shape of the annular clearance F1 is not limited thereto. For example, as shown in FIGS. 7A and 7B, the cross-sectional shape of the hole 20 and the core member 30 may be square, and the cross-sectional shape of the annular clearance F1 may be square-ring shaped. Also, in such a case, the interlinking parts 50 may be located on the surfaces opposite to each other, thereby interlinking and supporting the core member 30 relative to the hole wall 20a. In this manner, the cross-sectional shape of the annular clearance F1 is not limited to a circular shape, but may be a triangle-ring shape, square-ring shape, or polygonal-ring shape. Also, the annular shape may be not only a circular shape but also an elliptical shape. Also, in the foregoing embodiments, the two interlinking parts 50 are located exactly opposite each other. But there is no limitation to the number as long as the interlinking part 50 is strong enough to interlock and support the core member 30 immobile. Also, a plurality of interlinking parts 50 may be provided along the hole axis m.

It is to be noted that in the foregoing embodiment, descriptions have been given of molds for cure-molding tires. However, the molds are not limited to those in tire manufacturing, but may be molds to be used in the molding of other rubber articles, such as rubber crawlers and rubber vibration isolators.

Also, in the foregoing embodiments, descriptions have been given of formation of a mold as a three-dimensional object by sintering metal powder with a laser beam directed thereto. However, it is possible to direct an LED beam from a semiconductor of a semiconductor laser in the place of an ordinary laser beam as described above. Thus, an energy source, including any light beam for sintering metal powder, may be selected according to the properties of the metal powder to be sintered.

Also, the material for constituting the mold is not limited to the metal powder as described so far, but may be resin powder, such as synthetic resin, ceramics or ceramic powder, which is an inorganic sintered material, or a composite material powder, which is a mixture of resin powder, ceramic powder, and metallic powder.

One arrangement of a rubber article mold according to this invention is a rubber article mold having a hole penetrating from a molding surface for molding a rubber article to a back surface thereof, a core member disposed within the hole and forming an air discharge flow channel annular in cross section extending along the extension direction of the hole between itself and the hole wall forming the hole, and an interlinking part interlinking the hole wall to the core member.

According to this arrangement, with the core member interlinked to the hole wall forming the hole via the interlinking part, there is no need for performing any additional processing to the hole. Also, the surface rubber of the tire to be cured enters into the air discharge flow channel of an annular cross section along the hole axis between the hole wall and the core member. As a result, the spew after the cure-molding will be shaped annular, thus making it harder for the spew to sever and reducing the possibility of the spew to remain within the air discharge flow channel. Also, the spew formed annular will lower the protrusion height above the tire surface than that of conventional spews and make the spew thickness thinner. This will minimize the adverse effects on the aesthetic quality and performance of the tire. Accordingly, the efficiency in tire production can be improved without compromising the aesthetic quality and performance of the tire after cure-molding.

Also, another arrangement of a rubber article mold according to the invention is a rubber article mold in which the interlinking part interlinks the hole wall to the core member on the back surface side thereof and the air discharge flow channel annular in cross section opens on the molding surface, or the interlinking part may interlink the core member immovably to the hole wall under the pressures of the tire acting on the end surface of the core member on the molding-surface side.

By this arrangement, too, the annular spews may be formed more reliably on the tire surface.

Also, it is preferable that the end surface of the core member on the molding surface side is flush with the molding surface or that the interlinking part extends from the hole wall toward the hole axis.

Also, when the size of the air discharge flow channel is larger than 0 mm and smaller than 0.5 mm, thin-walled annular spews can be formed while retaining air discharge. Also, the spew formed by the air discharge flow channel can disappear altogether or disappear intermittently, making it unnecessary to cut the spew. For example, by making the clearance dimension of the air vent hole smaller than 0.06 mm, there will be almost no entry of rubber into the air vent hole, while ensuring air discharge. Thus, the tire, which is one of the rubber articles, may be molded with great improvement in the aesthetic quality and motion performance.

Also, the hole wall forming the hole, the core member, and the interlinking part may be molded by an additive manufacturing process to efficiently form the air discharge flow channel with high shape accuracy.

Also, an annular hollow cavity penetrating from a molding surface for molding a rubber article to a back surface thereof is formed as a space enclosed by an outer member and an inner member forming the hollow cavity not including the interlinking part interlinking the inner member to the outer member. Therefore, the spew formed annular will make the protrusion height above the tire surface lower than that of conventional spews and make the spew thickness thinner. This will minimize the adverse effects on the aesthetic quality and performance of the tire. Accordingly, the efficiency in tire production can be improved without compromising the aesthetic quality and performance of the tire after cure-molding.

The foregoing specification does not necessarily recite all of the features essential to the invention, and those skilled in the art will readily appreciate that subcombinations of all these features and modifications are intended to be within the scope of the invention.

DESCRIPTION OF REFERENCE NUMERALS 9 side mold
11 tread mold
11*a* molding surface
11*b* back surface
air discharge means
F1 annular clearance
F2 arc-shaped clearance
T tire
Ts side region

The invention claimed is:

1. A mold for rubber articles comprising:
   a hole penetrating from a molding surface of the mold for molding a rubber article to a back surface of the mold;
   a core member disposed within the hole and forming an air discharge flow channel annular in cross section extending along an extension direction of the hole between the core member and a hole wall forming the hole; and
   an interlinking part interlinking the hole wall to the core member,
   wherein a length of the core member along a hole axis in the extension direction is equal to or less than a thickness from the molding surface to the back surface;
   wherein the hole, the core member, and the interlinking part comprise sintered layers molded by an additive manufacturing process, the sintered layers being layered in a lamination direction; and
   wherein the sintered layers extend perpendicular to the lamination direction and obliquely relative to the hole axis such that, during the manufacturing process, a number of the sintered layers forming the interlinking part are molded before a start of molding a part of the core member.

2. The mold for rubber articles of claim 1, wherein the interlinking part interlinks the hole wall to the core member on a back surface side of the mold and the air discharge flow channel annular in cross section opens on the molding surface.

3. The mold for rubber articles of claim 1, wherein the interlinking part interlinks the core member immovably to the hole wall under pressures of a tire acting on an end surface of the core member on a molding-surface side of the mold.

4. The mold for rubber articles of claim 1, wherein an end surface of the core member on a molding surface side of the mold is flush with the molding surface.

5. The mold for rubber articles of claim 1, wherein the interlinking part interlinks the hole wall to the core member at a shortest distance between the hole wall and the core member.

6. The mold for rubber articles of claim 1, wherein the size of the air discharge flow channel is larger than 0 mm and smaller than 0.5 mm.

* * * * *